Dec. 21, 1965  L. TINNES  3,225,171
AUTOMATIC PIPE WELDING APPARATUS
Filed Feb. 17, 1964  2 Sheets-Sheet 1

INVENTOR.
LEROY (NMI) TINNES
BY
ATTORNEYS

INVENTOR.
LEROY (NMI) TINNES
BY
ATTORNEYS

United States Patent Office 3,225,171
Patented Dec. 21, 1965

3,225,171
AUTOMATIC PIPE WELDING APPARATUS
Leroy Tinnes, 744 Ohio St., Vallejo, Calif.
Filed Feb. 17, 1964, Ser. No. 345,539
2 Claims. (Cl. 219—60)
(Granted under Title 35, U.S. Code (1952), sec. 266)

The invention described herein may be manufactured and used by or for the Government of the United States of America for governmental purposes without the payment of any royalties thereon or therefor.

The present invention relates to pipe welding apparatus, and particularly, to apparatus of an automatic as opposed to manually-operated type.

It is recognized that automatic pipe welding machines have been developed and also that such machines have been so constructed as to be physically mounted on the pipe and rotated relative to it to accomplish the work. If properly constructed such machines permit closer control of the work and result in far fewer rejects.

However, as will be appreciated, it is most desirable that the construction of the machines also permit the working parts to be assembled and disassembled around a length of pipe rather than be slipped over a pipe end which frequently is not available. This capacity for "assembly-on-location" can be overcome by constructing a machine of complementary halves capable of being dowelled and secured together about the pipe, and some machines have employed this technique. Nevertheless, for a variety of reasons, the resulting mechanisms appear unduly large and complex even to the extent that they sacrifice a significant part of their versatility.

Thus, large machines which require a substantial operating radius for their rotating members are of rather limited utility particularly in situations where the work must be done in areas of restricted accessibility. For example, in shipboard welding operations utilizing consumable insert type butt joints, it often is desirable to automatically weld the joints in areas which permit only about three and one-half inches of clearance from the surface of the pipe to the closest obstruction. Obviously, a compact piece of equipment with an operating radius of less than three and one-half inches must be provided for such jobs. Also, automatic welding operations frequently may be limited by the available length of straight pipe on which the machine is to be mounted. Here again, if only about three and one-half inches of straight pipe is available for the mounting purpose, the size of the machine will restrict its use.

It is therefore, an object of the present invention to provide an automatic pipe welding machine utilizing a rotating welding head, the machine being so constructed as to permit its use in restricted areas.

A related object is to provide such a machine in which the maximum radius of its rotating parts is no more than about three and one-half inches.

A further object is to provide a machine according to the foregoing objects capable of making a weld in any position, i.e. vertical, horizontal or any other rotated positions between these two limits.

Yet another object is to provide a machine in which the control of the welding head is very close so as to permit the making of satisfactory welded joints with an unusually low rejection rate.

Other more general objects are to provide a machine of the type under consideration, the machine being relatively sturdy, inexpensive, formed of simple structural parts and capable of operating in a simple reliable manner without requiring particular skills on the part of the operator.

Other objects will become apparent in the ensuing detailed description.

These and other objects of the invention are achieved primarily by providing a machine utilizing a pinion-driven ring gear which, in turn, carries a torch holder, the general functional arrangement permitting a welding operation in which the ring gear may be driven to physically rotate the torch holder about the work. As a further important feature, the machine is constructed in such a manner that the ring gear and other parts may be assembled about a length of pipe without the need for slipping the entire machine over a pipe end. As will become more apparent from the following detailed description, the structural management permits a simplified construction resulting in a small, compact and relatively rugged piece of equipment adapted for use even in confined areas.

A preferred embodiment of the invention is illustrated in the accompanying drawings of which:

Figure 1:
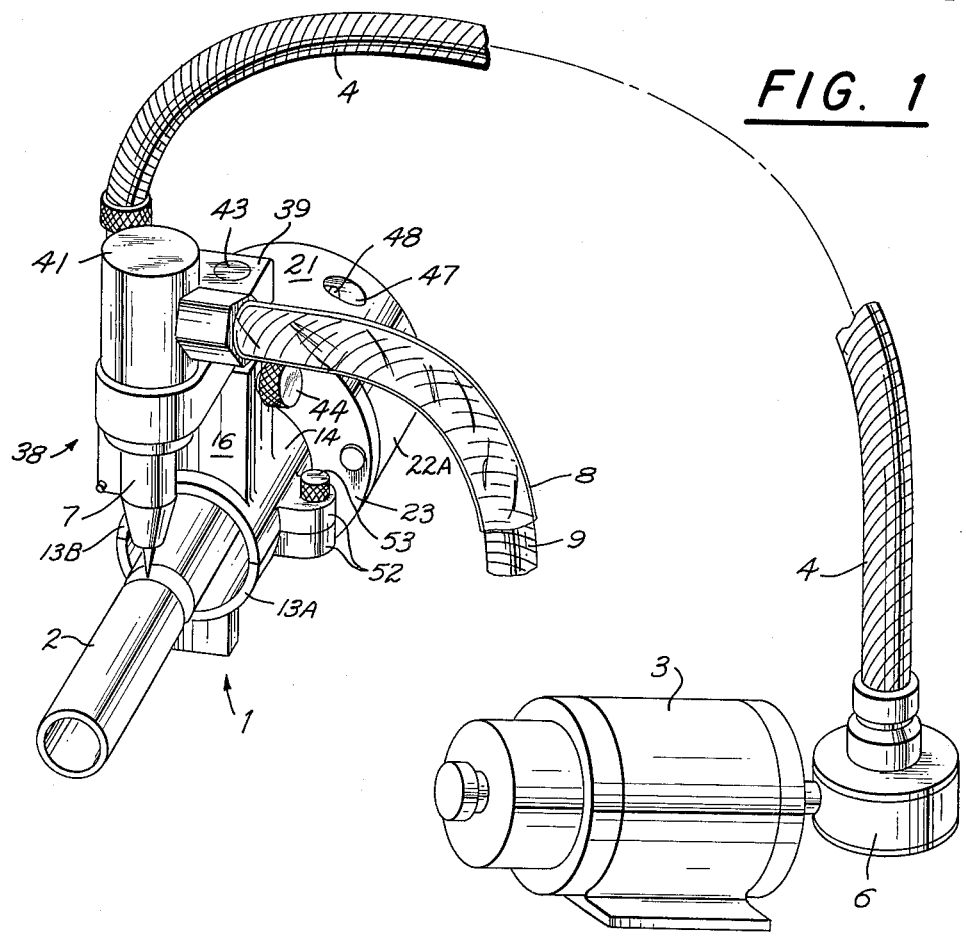
FIG. 1 is a perspective showing the welding machine mounted on a length of pipe.
Figure 2:
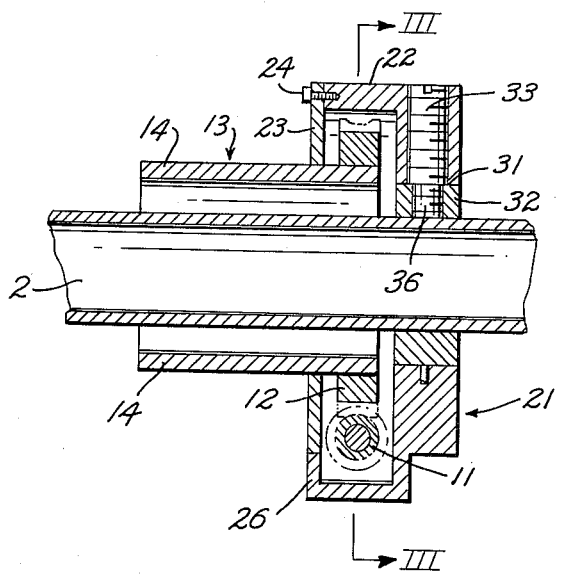
FIG. 2 is a horizontal section taken centrally through the pipe and the machine.
Figure 3:
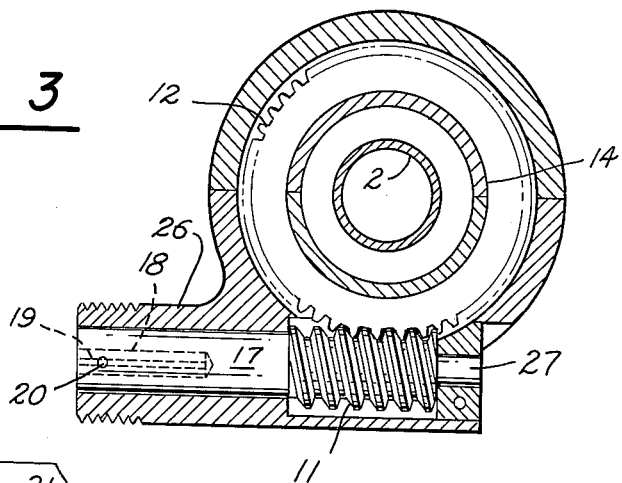
FIG. 3 is a view taken along line 3—3 of FIG. 2.

Referring to FIG. 1, the machine, generally designated by numeral 1, is illustrated as being mounted on a pipe 2 preparatory to accomplishing a welding operation. The operation illustrated in FIG. 1 is intended to be the welding of consumable insert type butt joints in one-half inch or one inch I.P.S. stainless steel pipe. Usually, this welding operation is accomplished by the tungsten arc, inert gas process and, as shown, the job is to be performed automatically by rotating the welding head about the weld area. The machine obviously also is capable of performing other types of welding operations than the particular one illustrated.

A variable speed electric motor 3 provides the power for rotating the welding head through a flexible shaft 4, coupled between a gear box 6 and the head proper.

Welding current for the operation may be supplied by a D.C. welding power source (not shown) and, as is customary, the source may have a super-imposed high frequency for initiating the arc. Standard tungsten arc inert gas welding torches, such as a torch 7 may be employed. For operations of the type shown, 1/16 inch diameter 2 percent thoriated pointed electrodes have produced excellent results. An argon-shielding gas flow of about 15 CSH also is preferred and the gas flow may be delivered to the work through a tube 8 which, as seen, also encases a power line 9 for the welding current.

Considering the structural aspects of the machine, it first will be noted that the drive of flexible shaft 4 is imparted to a worm 11 which, in turn, drives a worm wheel or ring gear 12. The ring gear is part of a ring gear assembly, generally indicated by numeral 13, the assembly including a shaft 14 formed integrally with the ring gear and carrying at its outer end a radial flange 16 which, as will be described, is adapted to hold torch 7 in a properly oriented and spaced position relative to the work. Obviously, rotation of worm 11 drives ring gear 12 to rotate flange 16 and also the welding torch circumferentially about the work. Tube 8 and line 9 also rotate with the torch. In greater detail, the coupling of flexible shaft 4 to worm 11 is achieved by providing the worm with a short shaft 17 having a socket 18 formed in its outer end to receive a drive rod 19 of the flexible shaft. A set screw 20 is employed to secure the interconnection.

A worm housing 21 rotatably carries worm 11, as well as ring gear 12, the housing being formed of a body portion 22 and a cover plate 23, which, as may be noted, is detachably secured to body portion 22 by a plurality of circumferentially-disposed screws 24. Worm 11 is mounted in a lateral flange portion 26 which provides bearing surfaces at both ends of the pinion. More specifically the worm is journalled at one end by its previously-identified shaft 17 and at the other by another short shaft length 27.

Ring gear 12, of course, is meshed with worm 11 and it also is journaled in worm housing 21. Thus, as shown, cover plate 23, which is part of the housing projects radially inwardly a sufficient distance to provide bearing surfaces which rotatably support shaft portion 14 of the ring gear assembly.

As will be appreciated, the machine must be rotatably supported by the pipe itself. For this purpose, the central bore of pinion housing 21 has a reduced diameter portion 31 adapted either to fit the pipe or to receive a bushing 32 which closely fits and clamps the pipe. Various sizes of bushings may be provided to accommodate various pipe sizes. A set screw 33 extends radially through a threaded radial bore of the housing, the inner end of this set screw being formed with a short extension 36 receivable in bushing 32. Rotation of screw 33 tightens the bushing about the pipe to clamp the housing in a fixed position relative to the pipe.

As already indicated, ring gear assembly 13 includes an integral flange 16 which is adapted to support torch 7 in position to accomplish the work. For this purpose, flange 13 is provided with a pair of parallel bores 37 and a special torch holder assembly 38 is provided to adjustably fit into thees bores. Assembly 38 is formed of a flat plate 39 having a large opening at one of its ends to receive the torch. More specifically, torch 7 is received in a torch body portion 41 which itself may be threaded into the torch-receiving opening of plate 39. Tube 8 and line 9 communicate with the torch through torch body 41, there being suitable passageways in the torch body and its associated parts to permit this communication. However, since the particular mounting of the torch is specially adapted for only one of a variety of different welding operations, these details of the mounting are not illustrated.

Torch holder assembly 38 as a unit is adjustably carried by flange 16 of the ring gear assembly, and, to achieve the adjustable mounting, the holder assembly is provided with a pair of tines 43 receivable in bores 37 of the flange. A set screw 44 is threadably received in one side of the flange so as to bear against one of the tines and secure the holder in any fixed position.

Figure 4:
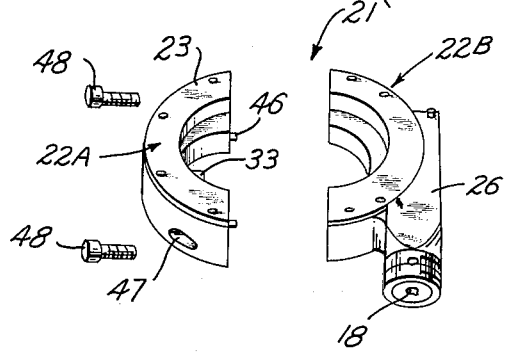
FIGS. 4, 5 and 6 are individual views of the three parts of the machine which are formed of complementary mating halves, the halves of each of these views being shown in an exploded relationship.
Figure 5:
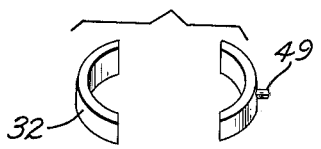
Figure 6:
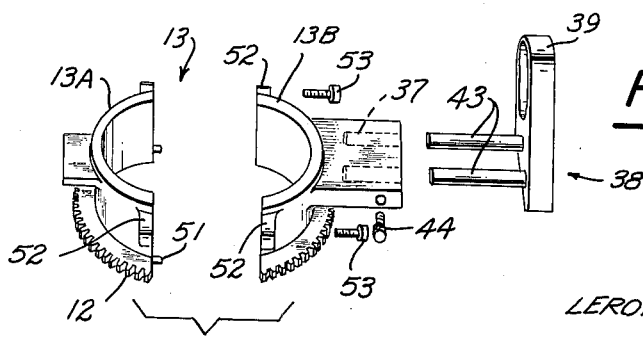

Further features of the invention are illustrated in FIGS. 4, 5 and 6. As will be recalled, it is most desirable to avoid the necessity of shipping an assembled machine over an end of the pipe to bring the machine into proper position for the welding operation. Accordingly, automatic machines of the present type may be made in separable, complementary halves to be assembled on location about the pipe and subsequently disassembled when the operation has been completed. Because of this feature the machine is far more versatile particularly when it is to be used in confined areas. The previously-described construction and arrangement of the elements of the present machine lends itself particularly well to the "on location" assembling and disassembling of the machine. Thus, as will become apparent, only three of the parts need be made of complementary halves, one of these three being bushing 32 which, in effect, is an accessory used to adapt a machine for types of different pipe diameters. The other two mating parts are housing 21 and ring gear assembly 13.

Referring to FIG. 4, housing 21 is made of halves 22a and 22b, half 22a being formed with dowels 46 receivable in half 22b. Also, both halves are provided with threaded bores to receive screws 48 by means of which the two halves are held together. As will be noted, flange 26 of the housing is carried by half 22b. The other half 22a threadably receives screw 33 by means of which the bushing is clamped about the pipe.

FIG. 5 illustrates the separate halves of bushing 32 and it may be noted that one of the halves has a dowel 49 which, when the bushing is inserted into the housing, is received in half 22b of the housing. The other half of the bushing has a socket into which extension 36 of set screw 33 projects.

FIG. 6 shows the separate halves of ring gear assembly 13, these halves being identified by numerals 13a and 13b. To permit the assembly of these halves about the pipe, the ring gear proper, of course, is divided into two parts which fit together by means of dowels 51 carried by portion 13a of the ring gear assembly. To secure the two halves, each is formed with laterally extending flange portions 52 which, project outwardly from shaft 14 in the vicinity of flange 16. Each flange has alignable threaded openings to receive coupling screws 53.

The operation of the machine should be reasonably apparent from the foregoing description. The complementary parts may be assembled in different manners, although, customarily, portion 22b of the housing first is fitted with one-half of bushing 32 and then set in proper position close to the area to be welded. The other half of the bushing next is fitted into portion 22a of the housing and the housing assembled and clamped on the pipe by tightening screws 48. Preferably, during this operation, cover plate 23 of the housing is detached. The ring gear assembly next is slipped into place and oriented so that the ring gear meshes with the worm and torch holding flange 16 projects upwardly from the work. With the ring gear so positioned and oriented, cover plate 23 is secured to provide the essential bearing support for the ring gear assembly. Flexible cable 4 then may be connected in the obvious manner and torch holder assembly 38 fitted and secured in the bores of flange 16. More suitably, when a pipe is to be welded in a horizontal position, the tungsten electrode of the torch is positioned directly over the center of the insert with a clearance of $5/64$ inch, this distance, most suitably, being determined by a $5/64$ inch diameter wire gauge. If the pipe weld is to be made with the pipe in a vertical position, the tungsten electrode may, more suitably, be located over the bottom edge of the exposed insert again with a clearance of $5/64$ inch.

In use, when the operation is one of welding pipe in a horizontal position, the weld best is started at either the three o'clock or nine o'clock position and it should progress in such a direction as to first move over the top of the pipe. If the pipe is to be welded in a vertical position, the starting point may be at any location. Welds performed on one-half inch pipe either in a horizontal or vertical position, may progress at a travel speed of about one revolution in about sixty-five to seventy seconds, although this may vary somewhat on other conditions and on the welding current used. For a one-inch pipe, one revolution is made in about ninety to ninety-five seconds.

The advantages of such a machine are substantial. First, compared to manual welds the automatic accomplishment of the job permits the making of quality welded joints without the need for substantial training to develop manual skills. A very close control of the welding operation is obtained thereby providing satisfactory welded joints with a very low rejection rate. Also, the machine will make welds in any position, i.e. vertical, horizontal, or degrees in between.

A most significant advantage, aside from those obtained by the utilization of an automatic process, is the fact that such a process can be carried out even though the area in which the work is to be conducted is restricted by nearby obstructions. For example, a machine made in accordance with the present teachings requires only three and one-half inches of clearance for operation and it may be made even smaller if so desired. In other words, the radial distance from the exterior of the pipe to the outermost portion of the machine which, as may be noted, is the outer end of torch holder body portion 41, is only about three and a half inches or less. Also, the length of the machine, as measured axially of the pipe, is quite small so that only three and one-half inches of straight pipe is required for mounting purposes. Finally, as will be appreciated, the different elements making up the machine are quite simply and inexpensively constructed, and the parts can be easily and quickly assembled and disassembled about the pipe.

Obviously many modifications and variations of the present invention are possible in the light of the above teachings. It is therefore to be understood that within the scope of the appended claims the invention may be practiced otherwise than as specifically described.

What is claimed is:

1. Apparatus for welding pipe comprising:
   a worm wheel housing provided with a continuous cylindrical bore formed of an enlarged diameter portion and a reduced diameter portion, the latter portion being adapted to closely engage said pipe,
   pipe-clamping means carried by said housing and retractably extending radially into said latter bore portion for securing said housing in a fixed position on said pipe,
   a tubular shaft extending coaxially with said bore and having its major length disposed externally of said housing with a portion of its length projecting internally into said enlarged bore portion of said housing,
   an annular flange projecting radially outwardly from said interior end of said shaft,
   gear teeth spaced from said housing on said flange periphery for forming a worm wheel,
   a worm meshed with said gear teeth and journaled in said housing with its rotational axis disposed perpendicularly to the axis of said shaft,
   a remotely-driven elongate flexible drive shaft operatively coupled to said worm for rotatably driving the worm as well as the worm wheel and said shaft,
   an annular cover plate detachably secured to one end of said housing radially outwardly of said shaft,
   said cover plate having an internal diameter sized to closely receive and provide bearing support for said shaft whereby said shaft and worm wheel form an independent assembly supported by said worm and cover plate,
   an electrode holder flange carried by an extending substantially radially outwardly from said exterior portion of said shaft, and
   a welding electrode assembly carried by said holder flange in position for welding said pipe,
   said housing, worm wheel, shaft and cover plate each being formed of complementary halves adapted to be assembled around said pipe,
   whereby said apparatus may be assembled in a fixed position on a length of pipe and said worm remotely driven for rotating said electrode assembly relative to the pipe.

2. The apparatus of claim 1 wherein said holder flange projects radially from said shaft and is provided in its end portion with a pair of longitudinal bores,
   said electrode assembly including a pair of tines receivable in said bores, and
   said holder flange further including means for adjustably holding said tines in various positions in said bores.

References Cited by the Examiner

UNITED STATES PATENTS

| | | | |
|---|---|---|---|
| 2,206,549 | 7/1940 | McIntosh et al. | 219—82 |
| 2,263,038 | 11/1941 | Heim | 219—82 |
| 2,914,653 | 11/1959 | Ernst | 219—125 |
| 2,985,746 | 5/1961 | Harmes | 219—125 |
| 3,035,147 | 5/1962 | Latter | 219—60.1 |
| 3,042,787 | 7/1962 | Kotecki | 219—60.1 |

RICHARD M. WOOD, *Primary Examiner.*